United States Patent

Patent No.: 2339a

The United States of America,

TO ALL TO WHOM THESE Letters Patent SHALL COME.

Whereas

*the United States hath alleged that he has invented a new and useful improvement*

*which improvement he states has not been known or used before his application; hath that he does verily believe that he is the true inventor or discoverer of the said improvement; hath paid into the Treasury of the United States the sum of thirty dollars, delivered a receipt for the same, and presented a petition to the Secretary of State, signifying a desire of obtaining an exclusive property in the said improvement, and praying that a patent may be granted for that purpose:* These are therefore *to grant, according to law, to the said his heirs, administrators, or assigns, for the term of fourteen years, from the day of one thousand eight hundred and the full and exclusive right and liberty of making, constructing, using and vending to others to be used, the said improvement; a description whereof is given in the words of the said himself, in the schedule hereto annexed, and is made a part of these presents.*

In Testimony whereof, *I have caused these Letters to be made Patent, and the Seal of the United States to be hereunto affixed.*

*GIVEN under my hand, at the city of Washington, this day of in the year of our Lord one thousand eight hundred and and of the independence of the United States of America, the*

[illegible] Madison

*BY THE PRESIDENT.*

[illegible] *Secretary of State.*

*City of Washington, To Wit:*

I DO HEREBY CERTIFY, That the foregoing Letters Patent were delivered to me on the day of in the year of our Lord, one thousand eight hundred and to be examined; that I have examined the same, and find them conformable to law; and I do hereby return the same to the SECRETARY of STATE within fifteen days from the date aforesaid, to wit; on this day of in the year aforesaid.

[illegible]

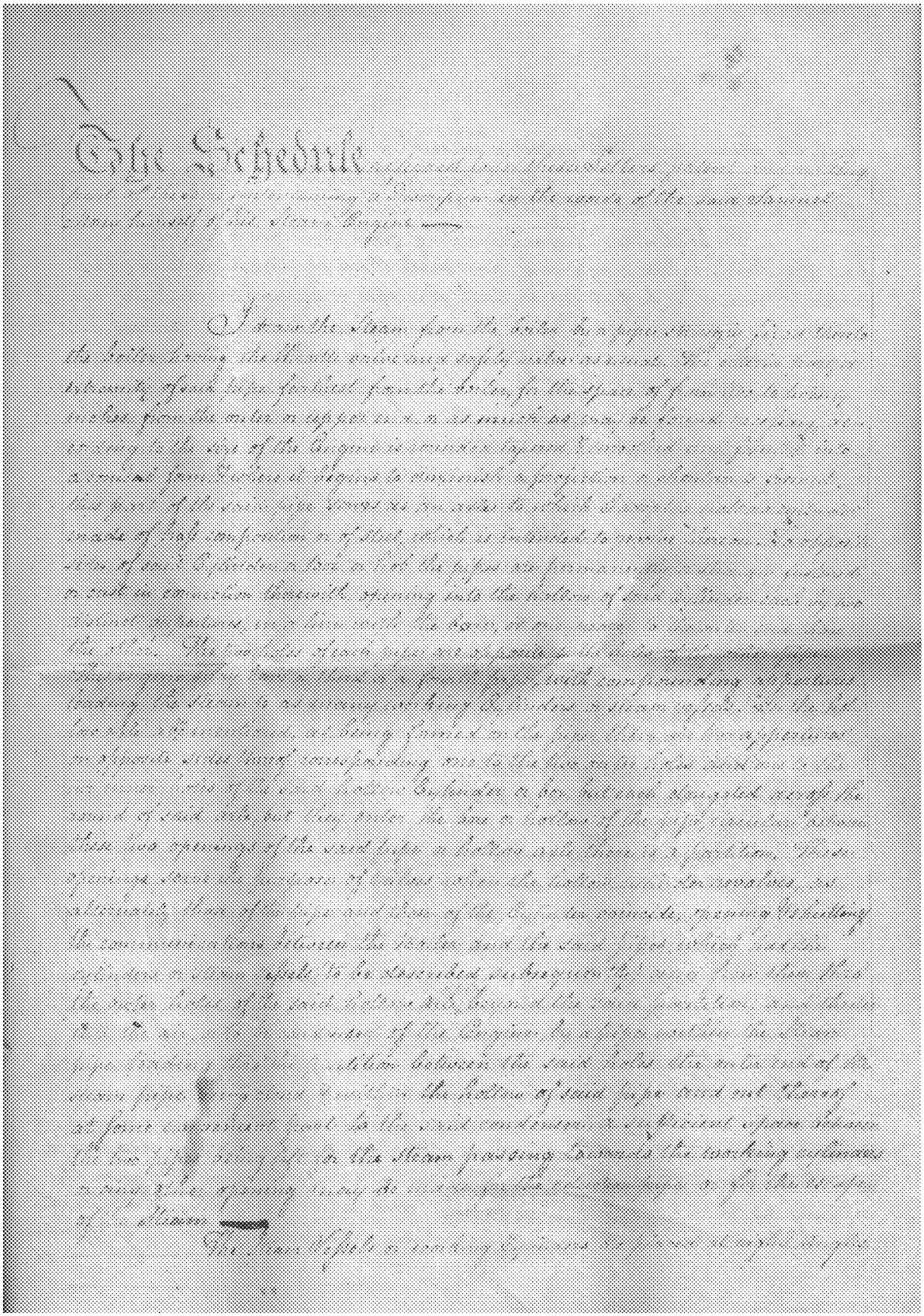

*Attorney General of the United States.*